UNITED STATES PATENT OFFICE.

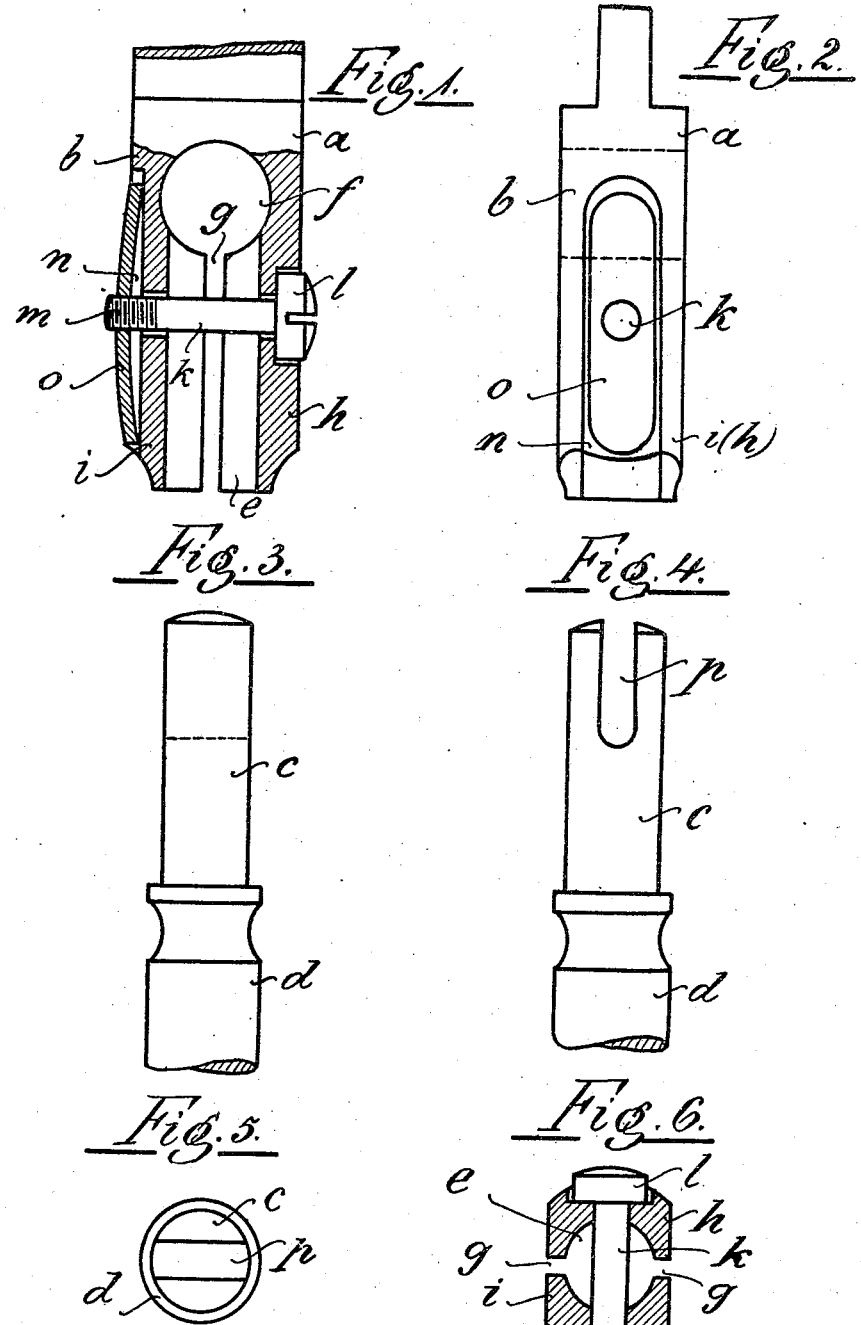

GEORG SCHOENNER, OF NUREMBERG, GERMANY.

COMPASSES.

No. 855,592.         Specification of Letters Patent.         Patented June 4, 1907.

Application filed November 28, 1906. Serial No. 345,542.

*To all whom it may concern:*

Be it known that I, GEORG SCHOENNER, manufacturer, a subject of the German Emperor, residing at Nuremberg, Bavaria, Germany, have invented new and useful Improvements in Compasses, of which the following is a specification.

This invention relates to an improvement in those means of securing attachments in compasses in which the pin of the attachment is inserted in the slotted end of the compass arm, which end is formed as a spring sheath or socket. By the modification of this known means of securing the attachment which forms the object of the present invention it is intended to produce near the free ends of the lugs of the compass arm, a clamping device, which may be regulated, supplementary to the spring pressure of the said lugs, and thereby to render the clamping connection more reliable. This object is attained by the ends of a strip spring bearing against the lug of one of the compass arms, the middle of which spring is engaged by a tightening screw passing through both lugs of the arm, and in accordance with the screw being tightened up, exerts a greater or lesser pressure against the root as well as against the free end of one lug of the arm.

An attachment securing device of this kind is shown in Figs. 1—6 of the accompanying drawings.

The sheath or socket $b$, forming the end of the compass arm, has a longitudinal perforation $e$ receiving the pin $c$ of the attachment $d$ and is divided into two spring lugs $h$ and $i$ by an elongated slot $g$ merging into a cross perforation $f$. These lugs are traversed with some play by a tightening screw $k$, the head $l$ of which, bears against the lug $h$ of the arm, and its other end carries a thread $m$. With this thread $m$ the screw engages in the middle part of an outwardly curved strip spring $o$ inserted in the recess $n$ on the lug $i$ of the arm and thereby the spring is drawn against the lug of the arm in such a way that its ends bear against the root and the free end respectively of this lug $i$. Now by means of the screw being turned, it is possible to regulate the pressure exerted by the strip spring on the free end of the lug $i$ of the arm, and consequently to obtain a reliable but easily released clamping connection.

By the same screw the direction of the attachment may also be secured and a special directing wedge dispensed with. For this object the attachment pin $c$ is merely made long enough to project upward into the socket above the screw $k$, which then in turn is inserted through a longitudinal slot $p$ in this pin $c$.

I declare that what I claim is:—

Means for securing an attachment in compasses comprising a leg having two lugs at its end forming a receiving socket for the attachment, one of said lugs having a recess on its outer face, a curved spring in said recess and a tightening screw passing through both lugs and engaging the middle part of the spring.

In testimony whereof I have signed my name to this specification in the presence of two subscribing witnesses.

GEORG SCHOENNER.

Witnesses:
    LEONHARD KOERBER,
    HERMANN DOEHLEMANN.